(12) United States Patent
May

(10) Patent No.: US 7,723,414 B2
(45) Date of Patent: May 25, 2010

(54) ANTISTATIC SYSTEM FOR POLYMERS

(75) Inventor: Donald Douglas May, Chadds Ford, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 392 days.

(21) Appl. No.: 11/955,800

(22) Filed: Dec. 13, 2007

(65) Prior Publication Data

US 2008/0153953 A1 Jun. 26, 2008

Related U.S. Application Data

(60) Provisional application No. 60/876,795, filed on Dec. 22, 2006.

(51) Int. Cl.
C08K 5/17 (2006.01)
C08K 5/5419 (2006.01)

(52) U.S. Cl. ........................ 524/247; 524/267; 524/398

(58) Field of Classification Search ................ 524/247, 524/267, 398
See application file for complete search history.

(56) References Cited

U.S. PATENT DOCUMENTS

| | | | |
|---|---|---|---|
| 2,642,416 A | 6/1953 | Ahlbrecht et al. | |
| 2,961,425 A | 11/1960 | Pierce et al. | |
| 3,083,224 A | 3/1963 | Brace et al. | |
| 3,094,547 A | 6/1963 | Heine | |
| 3,102,103 A | 8/1963 | Ahlbrecht et al. | |
| 3,282,905 A | 11/1966 | Fasick et al. | |
| 3,544,663 A | 12/1970 | Hauptschein et al. | |
| 3,655,732 A | 4/1972 | Rhondestvedt, Jr. | |
| 3,773,826 A | 11/1973 | Rhondestvedt, Jr. | |
| 3,786,089 A | 1/1974 | Rhondestvedt, Jr. | |
| 3,808,251 A | 4/1974 | Rhondestvedt, Jr. | |
| 4,145,382 A | 3/1979 | Hayashi et al. | |
| 4,266,080 A | 5/1981 | Falk et al. | |
| 4,269,992 A | 5/1981 | Litteral et al. | |
| 4,302,366 A | 11/1981 | Perronin et al. | |
| 4,310,698 A | 1/1982 | Cooke | |
| 4,504,401 A | 3/1985 | Matsuo et al. | |
| 5,104,647 A | 4/1992 | Policello | |
| 5,155,145 A * | 10/1992 | Foster et al. ................ 523/212 |
| 5,288,829 A | 2/1994 | Takago et al. | |
| 5,300,609 A | 4/1994 | Kobayashi | |
| 5,401,871 A | 3/1995 | Feldmann-Krane et al. | |
| 5,558,806 A | 9/1996 | Policello et al. | |
| 5,567,857 A | 10/1996 | Huang et al. | |
| 5,637,657 A | 6/1997 | Anton | |
| 5,789,515 A * | 8/1998 | Bruhnke ........................ 528/12 |
| 5,804,625 A | 9/1998 | Temperante et al. | |
| 5,827,919 A | 10/1998 | May | |
| 5,859,126 A | 1/1999 | Anton et al. | |
| 6,040,272 A | 3/2000 | Riego et al. | |
| 6,231,622 B1 * | 5/2001 | Chassot et al. ................ 8/405 |
| 6,271,289 B1 | 8/2001 | Longoria et al. | |
| 6,291,623 B1 | 9/2001 | Paulasaari et al. | |
| 6,497,933 B1 | 12/2002 | Yeager et al. | |
| 6,669,949 B2 | 12/2003 | Kennedy et al. | |
| 6,890,360 B2 | 5/2005 | Cote et al. | |
| 6,987,157 B2 | 1/2006 | Clement et al. | |
| 2002/0028868 A1 * | 3/2002 | Brasser et al. ............... 524/439 |
| 2004/0147188 A1 | 7/2004 | Johnson et al. | |
| 2008/0119598 A1 * | 5/2008 | May ........................... 524/262 |
| 2008/0145552 A1 | 6/2008 | Berrettini et al. | |

FOREIGN PATENT DOCUMENTS

| | | |
|---|---|---|
| EP | 0839876 | 5/1998 |
| EP | 1 238 004 B1 | 1/2004 |
| EP | 1 558 685 B1 | 12/2006 |
| FR | 2484425 | 12/1981 |
| JP | 49-117800 | * 11/1974 |
| JP | 61019877 | 1/1986 |
| JP | 01306428 | 12/1989 |
| JP | 02225585 | 9/1990 |
| JP | 02298338 | 12/1990 |
| JP | 1996024806 A | 1/1996 |
| JP | 1996040805 A | 2/1996 |
| JP | 1996059448 A | 3/1996 |
| JP | 1996061028 A | 3/1999 |
| JP | 1999147949 A | 6/1999 |
| JP | 2000128737 A | 5/2000 |
| JP | 2000128989 A | 5/2000 |
| JP | 3186341 B2 | 7/2001 |
| JP | 2001516818 A | 10/2001 |
| JP | 2004528404 A | 9/2004 |
| JP | 2005314358 A | 11/2005 |
| JP | 2005314651 A | 11/2005 |
| WO | WO 95/23192 | * 8/1995 |

(Continued)

OTHER PUBLICATIONS

Declaration of Donald Douglas May dated Mar. 20, 2009.

(Continued)

Primary Examiner—Milton I Cano
Assistant Examiner—John Uselding

(57) ABSTRACT

An antistatic system useful for mixing with thermoplastic polymers is disclosed which comprises an inorganic oxide, typically $TiO_2$, treated with a siloxane and an ethoxylated alkylamine. The antistatic system can be used in shaped polymer articles to improve the dust-attracting resistance of the articles.

20 Claims, No Drawings

FOREIGN PATENT DOCUMENTS

| WO | WO 97/02742 | 1/1997 |
| WO | WO 99/14422 | 3/1999 |
| WO | WO01/66480 | 9/2001 |
| WO | WO 02/061029 A2 | 8/2002 |
| WO | WO 2004067658 A1 | 8/2004 |
| WO | WO 2005/041661 A1 | 5/2005 |
| WO | WO 2006/001214 A1 | 1/2006 |
| WO | WO 2006/076716 A1 | 7/2006 |

OTHER PUBLICATIONS

Furukawa et al., Water and oil repellency of polysiloxanes with highly fluorinated alkyl side chains; Journal of Applied Polymer Science (2003), 87(7), 1085-1091; John Wiley & Sons, Inc. (Abstract).

\* cited by examiner

ANTISTATIC SYSTEM FOR POLYMERS

RELATED APPLICATION

This application claims the benefit of U.S. Provisional Application No. 60/876,795 filed on Dec. 22, 2006, incorporated by reference herein in its entirety.

BACKGROUND OF THE DISCLOSURE

1. Field of the Disclosure

The present disclosure relates to an improved antistatic system and a process for making the antistatic system and use of the antistatic system in thermoplastic polymer compositions to impart antistatic properties to the resultant plastic parts.

2. Description of the Related Art

High molecular weight polymers, for example, hydrocarbon polymers and polyamides, are melt extruded into shaped structures such as tubing, pipe, wire coating or film by well-known procedures wherein a rotating screw pushes a viscous polymer melt through an extruder barrel into a die in which the polymer is shaped to the desired form, and is then subsequently cooled and solidified into a product, that is, the extrudate, having the general shape of the die. In film blowing processes, as an extruded plastic tube emerges from the die, the tube is continuously inflated by air, cooled, collapsed by rolls and wound up on subsequent rolls.

Inorganic pigments may also be added to the thermoplastic polymer. In particular, titanium dioxide pigments are added to thermoplastic polymers for imparting whiteness and/or opacity to the finished article. To deliver other properties to the molded part or film, additional additives are incorporated into the processing step. What is needed is a titanium dioxide that has multiple properties associated with it.

One of these properties is charge dissipation known as antistatic. Additive treatment with an anti-electrostatic ("antistatic") agent can reduce the surface resistance and dust-attracting tendency of plastics. In order to get this property in light reflective or colored films, that is; those that are not black, a separate additive known as an antistatic agent may be added to the polymer composition during processing. This process adds additional cost and complexity to the process. What is needed is a non black pigment which imparts color and opacity along with charge dissipation properties.

Commercially available additives for antistatic treatment of plastics are, for example, alkyl-sulfonates, ethoxylated alkylamines, quaternary ammonium, and phosphonium salts and fatty acid esters. Specific polyalkylane ethers/polyalkylene glycols have also been described for antistatic treatment of plastics. Other examples of antistatic additives that have been described are ethoxylated long-chain aliphatic amines, long chain aliphatic amines, and amides, and phosphate esters.

Certain polysiloxanes have been known as "superwetters" for use in agricultural sprays, such as herbicides, fungicides or insecticides, for facilitating wet-out of the spray onto the plant or plant leaves to enhance application of the agricultural spray to the plant or plant leaf. Use of such polysiloxanes to improve the performance of antistatic agents in plastics is not known.

U.S. Pat. No. 6,497,933 discloses antistatic coatings containing an organic cationic polymeric electrolyte, a binder, and Silwet L-77 sold by Osi Specialties of Danbury, Conn. as a surfactant. The '933 patent describes applying the antistatic coating to a film surface. Nothing in the '933 patent teaches or suggests that Silwet 77 has antistatic properties or mixing Silwet 77 into a thermoplastic polymer melt would synergistically improve the performance of a migratory antistatic agent.

U.S. Pat. No. 5,401,871 discloses organopolysiloxane polyethers said to have increased resistance to hydrolysis. The '871 patent does not teach or suggest synergistic behavior of the organopolysiloxane polyethers with antistatic agents.

SUMMARY OF THE DISCLOSURE

The disclosure relates to a shaped polymer article having an improved surface resistivity comprising a major proportion of a thermoplastic polymer and a minor proportion of an antistatic system, wherein the antistatic system comprises an inorganic oxide, typically titanium dioxide pigment, having a treatment comprising (a) an ethoxylated alkylamine defined by the formula:

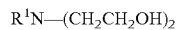

$$R^1N\text{---}(CH_2CH_2OH)_2$$

wherein $R^1$ is a $C_8$ to $C_{30}$ alkyl radical and (b) a polyoxyalkylene siloxane defined by the formula:

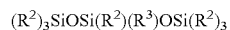

$$(R^2)_3SiOSi(R^2)(R^3)OSi(R^2)_3$$

wherein
  each $R^2$ is independently H, $CH_3$ or $C_2H_5$;
  $R^3$ is a polyoxyalkylene group having the following formula:

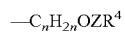

$$\text{---}C_nH_{2n}OZR^4$$

wherein
  Z is [ethylene oxide]$_a$ [propylene oxide]$_b$ in block or random order;
  n is independently an integer of 2 to 8;
    a is an integer of 0 to about 20; b is an integer of 0 to about 30; provided that a+b is from 1 to about 50;
    $R^4$ is independently H, OH, $OCH_3$, acetyl, or a linear or branched alkyl or aryl group having 1 to about 20 carbon atoms.

The siloxane can be a reaction product of a siloxane having the structure:

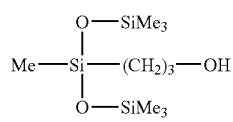

and the oxirane monomers:

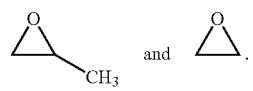

In one embodiment, the titanium dioxide is silanized.

The thermoplastic polymer can be selected from the group consisting of a polymer of an ethylenically unsaturated monomer; polyvinyl; polyvinyl ester; polystyrene; acrylic homopolymer and copolymer; phenolic; alkyd; amino resin; epoxy resin; amide; urethane; phenoxy resin; sulfone; carbonate; ester and chlorinated ester; ether; acetal resin; imide; and oxyethylene. Typically, the polymer is a polyolefin. Suitable polyolefins are selected from the group consisting of polyethylene, polypropylene, polybutylene, and copolymer of ethylene with a higher olefin or polyvinyl acetate.

In one typical embodiment, the shaped polymer article is a film. The film can have a surface resistivity of less than about $10E^{13}$ ohms.

The proportion of the thermoplastic polymer can range from 80 wt. % to about 99.99 wt. % and the proportion of the treated inorganic oxide can range from about 0.01 wt. % to about 20 wt. % based on the entire weight of the shaped polymer article.

In one particular embodiment of the disclosure, the antistatic agent is made by a process comprising:

(i) metering the siloxane, the polyethoxylated alkylamine or a mixture thereof into a flow restrictor, having an inlet and an outlet, a motive gas, to create a zone of turbulence at the outlet of the flow restrictor thereby atomizing the siloxane, the polyethoxylated alkylamine or a mixture thereof to form an atomized liquid; and (ii) contacting an inorganic oxide with the atomized liquid to form an antistatic agent with the atomized liquid.

DETAILED DESCRIPTION OF THE DISCLOSURE

The disclosure relates to an improved antistatic system, particularly for plastics; the improvement being the use of polyoxyalkylene siloxane to improve the performance of an ethoxylated alkylamine to impart reduced surface resistivity to shaped polymer articles.

The disclosure further relates to a process for treating an inorganic pigment, typically a titanium dioxide pigment, to form a treated pigment capable of being added to a thermoplastic polymer melt as a carrier of an antistatic system to the shaped polymer article made therefrom.

While not wishing to be limited to any theory or mechanism, the ethoxylated alkylamine can provide hydrophilicity to the thermoplastic polymer surface which provides static charge reduction. Additionally, while not wishing to be limited by any theory or mechanism the inorganic pigment can function, at least in part, as a carrier for the ethoxylated alkylamine and the siloxane treatments. During polymer processing at least a portion of the ethoxylated alkylamine, siloxane or both can become dissociated from the pigment and bloom to the surface of the thermoplastic polymer to reduce surface resistance.

The treated titanium dioxide pigment containing shaped polymer article has surface resisitivity sufficient for improved film antistatic properties so that the film tends to attract and hold less dust. Thus, the antistatic system of this disclosure can be used in shaped polymer articles to improve the dust-attracting resistance of the articles.

The resulting film usually has a surface resistivity of about $10E^{13}$ ohms or less, more typically a surface resistivity of about $10E^{12}$ ohms or less. Most preferably, the film has a surface resistivity in the range of about $10E^{10}$ to about $10E^{13}$, more preferably from about $10E^{10}$ to about $10E^{12}$.

Treated Pigment:

It is contemplated that any inorganic pigment will benefit from the treatment of this disclosure. By inorganic pigment it is meant an inorganic particulate material that becomes uniformly dispersed throughout a thermoplastic polymer melt and imparts color and opacity to the thermoplastic polymer melt. Some examples of inorganic pigments include but are not limited to ZnS, $TiO_2$, $CaCO_3$, $BaSO_4$, ZnO, $MOS_2$, silica, talc and clay. In particular, the pigment disclosed herein is an inorganic metal-containing pigment such as titanium dioxide. In this disclosure, where titanium dioxide is specifically mentioned it is contemplated that any of the inorganic pigments would be suitable.

Titanium dioxide ($TiO_2$) pigment useful in the present disclosure may be in the rutile or anatase crystalline form. It is commonly made by either a chloride process or a sulfate process. In the chloride process, $TiCl_4$ is oxidized to $TiO_2$ particles. In the sulfate process, sulfuric acid and ore containing titanium are dissolved, and the resulting solution goes through a series of steps to yield $TiO_2$. Both the sulfate and chloride processes are described in greater detail in "The Pigment Handbook", Vol. 1, 2nd Ed., John Wiley & Sons, NY (1988), the teachings of which are incorporated herein by reference.

By "pigment", especially with reference to titanium dioxide, the pigment particles can have an average size of less than 1 micron. Typically, the particles have an average size of from 0.020 to 0.95 microns, more typically, 0.050 to 0.75 microns and most typically 0.075 to 0.50 microns.

The pigment may be substantially pure titanium dioxide or may contain other metal oxides, such as silica, alumina, zirconia. Other metal oxides may become incorporated into the pigment particles, for example, by co-oxidizing or co-precipitating titanium compounds with other metal compounds. If co-oxidized or co-precipitated metals are present, they are typically present in an amount 0.1 to 20 wt %, as the metal oxide, more typically, 0.5 to 5 wt %, most typically 0.5 to 1.5 wt % based on the total pigment weight.

The titanium dioxide pigment may also bear one or more metal oxide coatings. These coatings may be applied using techniques known by those skilled in the art. Examples of metal oxide coatings include silica, alumina and zirconia among others. Such coatings may be present in an amount of 0.1 to 10 wt %, based on the total weight of the pigment, preferably 0.5 to 3 wt %.

Furthermore the $TiO_2$ particles, either as produced or subsequently treated with a metal oxide coated can, but not necessarily be further treated with organic compounds such as silanes, silicones, and polyhydric alcohols.

In the process for treating the pigment, the pigment particles are contacted with one or more of the ethoxylated alkylamines and one or more of the siloxanes as treating materials. These treating materials, their reaction products or combinations thereof, may be present as a coating, continuous or non-continuous, on the surface of the pigment. Typically, a continuous coating comprising the treating materials is on the surface of the pigment.

The ethoxylated alkylamine as a first treatment for the pigment can have the structure:

$$R^1N—(CH_2CH_2OH)_2$$

Wherein $R^1$ is a long chain hydrocarbon, typically $R^1$ is a $C_8$ to $C_{30}$ alkyl radical, more typically $R^1$ is a $C_8$ to $C_{24}$ alkyl radical, even more typically $R^1$ is a $C_{12}$ to $C_{24}$ alkyl radical, yet still more typically $R^1$ is a $C_{12}$-$C_{18}$ alkyl radical. Typically $R^1$ is a linear or branched alkyl radical, which can be fully or partially unsaturated. A commercially available ethoxylated alkylamine sold under the name Atmer® 163 (Ciba Specialty Chemicals, Tarrytown, N.Y.) in which $R^1$ contains 13 to 15 carbon atoms.

Ethoxylated alkylamines which contain less than about 8 carbon atoms in the alkyl radical would not be fully effective because the shorter chain alkyl radical would enable the ethoxylated alkylamines to bloom to the surface of a shaped polymer article too rapidly leading to poor antistatic effectiveness, especially over a long period of time which happens in storage. Additionally ethoxylated alkylamines with a shorter chain alkyl radical will tend to have an objectionable odor.

Ethoxylated alkylamines which contain more than about 30 carbon atoms in the alkyl radical will have difficulty blooming to the surface and thus not provide sufficient antistatic performance.

The polyoxyalkylene siloxane additive suitable for use as a second treatment of the pigment to provide the antistatic system of this disclosure is defined by the general formula:

$$(R^2)_3SiOSi(R^2)(R^3)OSi(R^2)_3$$

wherein each $R^2$ is independently H, alkyl, or aryl, preferably, $R^2$ is H, $CH_3$ or $C_2H_5$, more preferably H, or $CH_3$, and most preferably $CH_3$;

$R^3$ is a polyoxyalkylene group having the formula as follows:

$$—C_nH_{2n}OZR^4$$

wherein

Z is [ethylene oxide]$_a$ [propylene oxide]$_b$ in block or random order;

n is independently an integer of 2 to 8; most preferably 3 a is an integer of 0 to about 20; b is an integer of 0 to about 30; provided that a+b is from 1 to about 50;

$R^4$ is independently H, OH, $OCH_3$, acetyl, or a linear or branched alkyl or aryl group having 1 to about 20 carbon atoms; preferably H or methyl and most preferably H.

Many of these polyoxyalkylene siloxane additives are commercially available.

One such additive is a polyoxyethylene trisiloxane Q2-5211, available from Dow Corning Corporation. Midland, Mi.

Another such additive is Silwet L-77 available from GE Silicones General Electric Company, Wilton, Conn.

Another such additive is a polyoxyethylene trisiloxane Q2-5212, available from Dow Corning Corporation. Midland, Mi.

Another such additive is a polyoxyethylene trisiloxane Silsurf A012, available from Siltech Corporation. Toronto, Ontario.

Reference is made to U.S. Pat. No. 5,401,871, which is incorporated hereinby reference in its entirety, which describes such organopolysiloxane polyethers and methods of making them.

A yet additional suitable siloxane is a mixed oxirane and methyl oxirane polysiloxane. An example of such a siloxane is a mixed oxirane and methyl oxirane polymer of mono[3-[1,3,3,3-tetramethyl-1-[(trimethylsilyl)oxy]disiloxanyl]propyl]ether (CAS Number 134180-76-0) commercially sold as Tegopren 5840 by Degussa-Goldschmidt. This mixed oxirane siloxane is a reaction product of a siloxane having the structure:

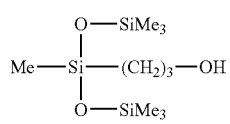

and the oxirane monomers:

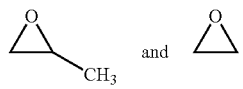

More particularly, the mixed oxirane siloxane is a polymerization product of propylene oxide and ethylene oxide and a siloxane having the structure:

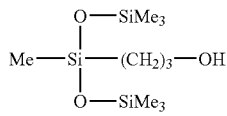

wherein Me is methyl.

The inorganic pigment is contacted with an amount of the ethoxylated alkylamine and the siloxane sufficient to treat the inorganic pigment such that when incorporated into a polymer, particularly a shaped polymer article, the polymer has improved antistatic properties. Usually, to achieve this end, the inorganic pigment is typically treated with the ethoxylated alkylamine in an amount ranging from about 0.5 wt. % to about 5 wt. %, more typically about 1 wt. % to about 2 wt. %, and the inorganic pigment is typically treated with the siloxane in an amount ranging from about 0.5 wt. % to about 5 wt. %, more typically about 1 wt. % to about 2 wt. %, based on the entire weight of the treated pigment. The ratio of siloxane to alkylamine can vary from about 1:99 to about 99:1, with preferable being about 1:1.

The ethoxylated alkylamine and the siloxane can be contacted with the pigment to achieve surface treatment by any suitable technique known in the art. No particular order for contacting the surface treating materials with the pigment is important but, usually, the pigment is first contacted with the ethoxylated alkylamine and then the siloxane is added. Alternatively, the siloxane can be first applied then the ethoxylated alkylamine can be applied. As another alternative, both the ethoxylated alkylamine and the siloxane can be added together, typically as a mixture especially when both are in liquid form.

The treating materials (the alkylamine and the siloxane) may be dissolved in a solvent or prepared as a mixture before contacting pigment, in dry or slurry form. In addition, the pigment may be immersed in the treating compound, if in liquid form which can be achieved by mixing them with a solvent to form a solution.

The treating materials can be mixed with the pigment using any suitable mixing techniques such as a V-cone blender fitted with an internal stirring bar. Typically the pigment and treating materials are mixed at ambient temperature, typically from about 20 to about 30° C. for a sufficient period of time suitable for surface treating the pigment, typically from about 5 minutes up to about 2 hours, usually about 15 minutes. Alternately, mixing may be accomplished by spraying the treating materials on the pigment followed by shaking for about 10- about 15 minutes.

The pigment can also be contacted with the ethoxylated alkylamine and the siloxane by the steps comprising:

(i) metering the ethoxylated alkylamine, the siloxane, either separately or as a mixture, into a flow restrictor, having an inlet and an outlet, with air or some other motive gas, to create a zone of turbulence at the outlet of the flow restrictor thereby atomizing the ethoxylated alkylamine, the siloxane or mixture thereof to form an atomized liquid; and (ii) contacting the pigment with the atomized liquid to form a treated pigment. The atomized liquid may be substantially uniformly coated on the surface of the pigment.

The foregoing steps can be combined in series or the ethoxylated amine and the siloxane can be mixed together with or without solvent and then contacted with the pigment. Alternatively, the foregoing steps can be used to surface treat the pigment before or after surface treatment with at least one of the treating materials described herein.

A silane compound can be used as an optional treatment for the pigment. A suitable silane can comprise a silane monomer.

A suitable silane compound is a silane monomer of the kind in which at least one substituent group of the silane contains an organic substituent. The organic substituent can contain heteroatoms such oxygen or halogen. Typical examples of suitable silanes include, without limit, alkoxy silanes and halosilanes having the general formula $R_xSi(R')_{4-x}$, wherein R is a nonhydrolyzable aliphatic group and R' is a hydrolyzable group such as an alkoxy, halogen, acetoxy or hydroxy or mixtures thereof; and x is an integer ranging from 1 to 3.

The nonhydrolyzable group will not react with water to form a different group. The hydrolysable group will react with water to form one or more different groups, which become adsorbed or chemically bonded to the surface of the titanium dioxide particle. Typically, R' is an alkoxy group having about 1 to about 4 carbon atoms, preferably, ethoxy or methoxy; a halogen, such as chloro or bromo; or acetoxy or hydroxy or mixture thereof. Preferably R' is chloro, methoxy, ethoxy, hydroxy, or mixture thereof. An especially suitable silane is octyl ethoxy silane.

The amount of inorganic present in the thermoplastic polymer composition and shaped polymer article will vary depending on the end use application. A suitable antistatic effective amount of the treated inorganic oxide will be apparent to those skilled in the art of thermoplastic polymer compounding and also the amount in the thermoplastic polymer composition or shaped polymer article can vary depending on the end use application and the amount of charge dissipation which is useful to an end user.

In general the treated inorganic oxide is present in a minor antistatic additive proportion and the thermoplastic polymer is present in a major proportion. Typically, the amount of treated inorganic oxide in the thermoplastic polymer composition for making a masterbatch can range from about 30 to about 90 wt %, based on the total weight of the masterbatch, preferably, about 50 to about 80 wt %, and the amount of the thermoplastic polymer ranges from about 10 to about 70 wt. %, preferably from about 20 wt. % to about 50 wt. %, based on the total weight of the masterbatch. The amount of treated inorganic oxide in an end use shaped polymer article, for example, a polymer film, can range from about 0.01 to about 20 wt %, and is preferably from about 0.1 to about 15 wt %, more preferably 5 to 10 wt %, based on the entire weight of the shaped polymer article, and the amount of the thermoplastic polymer can range from about 80 wt. % to about 99.99 wt. %, preferably from about 85 wt. % to about 99.90 wt. %, more preferably from about 90 wt. % to about 95 wt. %, based on the entire weight of the shaped polymer article.

Inorganic oxides treated in accordance with this disclosure are capable of being dispersed throughout the thermoplastic polymer melt. Typically the treated inorganic oxide can be uniformly dispersed throughout the thermoplastic polymer melt. Such inorganic oxides may exhibit some minor degree of clumping together within the thermoplastic polymer. However, an advantage of the treated inorganic oxides of this disclosure is that at least a portion, if not all, of the alkylamine and the siloxane separate from the inorganic oxide and bloom to the surface of a shaped polymer article such as a container or a film to provide a surface active antistatic effect.

Both dry or wet mixing of the treated inorganic oxide with the polymer are suitable. In wet mixing, the treated inorganic oxide, processing aid or both may be slurried or dissolved in a solvent and subsequently mixed with the other ingredients. Preferably, due to ease and performance, the treated inorganic oxide and thermoplastic polymer processing aid are dry mixed.

In one embodiment of this disclosure a first thermoplastic polymer containing a high loading of the inorganic oxide and other optional additives, such as processing aid, frequently called a "masterbatch", is melt blended with a second polymer, which acts as a diluent polymer. When used as a masterbatch, the thermoplastic polymer can provide both opacity and viscosity attributes to a polymer blend that can be utilized to form shaped articles. The first and second polymers, typically high molecular weight polymers, can be the same or different. Typically, the first and second polymers are highly compatible and even more typically, the first and second polymers are the same. The second polymer which acts as a diluent is usually free of pigment and processing aid but can contain other additive (such as an antiblock agent or antioxidant) which can be added by melt blending from the masterbatch containing the high molecular weight polymer and such other additive. While the amount of first high molecular weight polymer can vary depending on the polymer or mixture of polymers, the first polymer is typically present in an amount of from about 1 to about 60 wt. %, typically about 3 to about 50 wt %, even more typically about 3 to about 6 wt. %. based on the total weight of the polymer.

By "high molecular weight" it is meant to describe thermoplastic polymers having a melt index value of 0.01 to 50, typically from 2 to 10 as measured by ASTM method D1238-98. By "melt-processable," it is meant a thermoplastic polymer that can be extruded or otherwise converted into shaped articles through a stage that involves obtaining the polymer in a molten state.

Thermoplastic polymers which are suitable for use in this disclosure include, by way of example but not limited thereto, one or more polymers of ethylenically unsaturated monomers including olefins such as polyethylene, polypropylene, polybutylene, and copolymers of ethylene with higher olefins such as alpha olefins containing 4 to 10 carbon atoms or vinyl acetate; vinyls such as polyvinyl chloride, polyvinyl esters such as polyvinyl acetate, polystyrene, acrylic homopolymers and copolymers; phenolics; alkyds; amino resins; epoxy resins, polyamides, polyurethanes; phenoxy resins, polysulfones; polycarbonates; polyesters and chlorinated polyesters; polyethers; acetal resins; polyimides; and polyoxyethylenes. Mixtures of polymers are also contemplated.

Thermoplastic polymers suitable for use in the present disclosure also include one or more of various rubbers and/or elastomers, either natural or synthetic polymers based on copolymerization, grafting, or physical blending of various diene monomers with the above-mentioned polymers, all as generally known in the art.

Typically, the polymer is selected from the group consisting of polyolefin, polyvinyl chloride, polyamide and polyester, and mixture of these. More typically used polymers are polyolefins. Most typically used polymers are polyolefins selected from the group consisting of polyethylene, polypropylene, and mixture thereof. A typical polyethylene polymer is low density polyethylene and linear low density polyethylene.

Other Additives

A wide variety of additives may be present in the thermoplastic polymer composition produced by the process of this disclosure as necessary, desirable or conventional. Such additives include catalysts, initiators, anti-oxidants (e.g., hindered phenol such as butylated hydroxytoluene), blowing agent, ultraviolet light stabilizers (e.g., hindered amine light stabilizers or "HALS"), organic pigments including tinctorial pigments, plasticizers, antiblocking agents (e.g. clay, talc, calcium carbonate, silica, silicone oil, and the like) leveling agents, flame retardants, anti-cratering additives, fluorochemical polymer processing aids, other antistatic agents the same or different from the siloxane and the ethoxylated siloxane, antifog agent and the like.

Any melt compounding techniques, known to those skilled in the art may be used. Generally, the treated inorganic oxide, optionally, other additives and melt-processable polymer are brought together and then mixed in a blending operation, such as dry blending, that applies shear to the polymer melt. The melt-processable polymer is usually available in the form of powder, granules, pellets or cubes. Methods for dry blending include shaking in a bag or tumbling in a closed container. Other methods include blending using agitators or paddles. Treated inorganic oxide, polymer processing aid and melt-processable polymer may be co-fed using screw devices, which mix the treated inorganic oxide, polymer processing aid and melt-processable polymer together before the polymer reaches a molten state.

After mixing or blending, the polymer is melt blended, using any methods known in the art, including screw feeders, kneaders, high shear mixers, blending mixers, and the like. Typical methods use Banbury mixers, single and twin screw extruders, and hybrid continuous mixers.

Processing temperatures depend on the polymer and the blending method used, and are well known to those skilled in the art. The intensity of mixing depends on the degree of softening.

The thermoplastic polymer composition produced by the process of this disclosure is useful in production of shaped articles. A shaped article is typically produced by melt blending the thermoplastic polymer which comprises a first high molecular weight melt-processable polymer, with a second high molecular weight melt-processable polymer to produce the polymer that can be used to form the finished article of manufacture. The pigmented composition and second high molecular weight polymer are melt blended, using any means known in the art, as disclosed hereinabove. In this process, twin-screw extruders are commonly used. Co-rotating twin-screw extruders are available from Werner and Pfleiderer. The melt blended polymer is extruded to form a shaped article.

This disclosure is particularly suitable for producing shaped articles such as tubing, pipes, wire coatings, and films. The process is especially useful for producing films, especially blown films.

In one embodiment, the disclosure herein can be construed as excluding any element or process step that does not materially affect the basic and novel characteristics of the composition or process. Additionally, the disclosure can be construed as excluding any element or process step not specified herein.

Applicants specifically incorporate by reference the entire content of all cited references in this disclosure. Further, when an amount, concentration, or other value or parameter is given as either a range, more specific range, or a list of upper values and lower values, this is to be understood as specifically disclosing all ranges formed from any pair of any upper range limit or more specific value and any lower range limit or specific value, regardless of whether ranges are separately disclosed. Where a range of numerical values is recited herein, unless otherwise stated, the range is intended to include the endpoints thereof, and all integers and fractions within the range. It is not intended that the scope of the disclosure be limited to the specific values recited when defining a range.

EXAMPLES

Test Procedure Used in the Examples

Surface resistivity of the films made in accordance with the Examples was determined by placing the test film onto an eight inch by eight inch by ¼ inch thick piece of glass which served to sufficiently insulate it from the surface. The films were typically measured one day after being made in a normal laboratory environment at a temperature of 18-22° C. and a relative humidity of 40-60%. Surface resistivity was determined with a Trek Model 152, Medina N.Y. USA) fitted with a concentric ring probe and was the average of 5 readings. Resistivities of greater than $1E^{14}$ were measured on a Keithley 6517-A resistivity meter (Cleveland Ohio).

In the following Examples all parts, percentages and proportions are by weight unless otherwise indicated.

Comparative Example 1

A 1000 gm sample of silanized pigmentary titanium dioxide R-104, (commercially available from E.I. du Pont de Nemours and Company, Wilmington, Del.) was dispersed into polyethylene at 70 wt. percent using a Banbary Farrel mixer. This material, known as a masterbatch, was then let down to 25 wt. percent titanium dioxide in a cast film die to produce a 4 mil (101.6 micron) film. The measured surface resistivity was $3.9E^{16}$ ohms.

Comparative Example 2

A 1000 gm sample of pigmentary silanized titanium dioxide (commercially available from E.I. du Pont de Nemours and Company, Wilmington, Del.) was treated with 10 grams of poly(oxy-1,2-ethanediyl), α-[3-[1,3,3,3-tetramethyl-1(trimethylsilyl)oxy]disiloxanyl]propyl]-ω-hydroxy (Q2-5211, commercially available from Dow Corning) in a V-cone blender. The sample was heat cured for 1 hour at 100° C. to remove residual solvents. The treated pigment was dispersed into polyethylene at 70 wt. percent using a Banbary Farrel mixer. This material, known as a masterbatch, was then let down to 25 wt. percent titanium dioxide in a cast film die to produce a 4 mil (101.6 micron) film. The measured surface resistivity was greater than $1.0E^{14}$ ohms.

Comparative Example 3

A 1000 gm sample of pigmentary silanized titanium dioxide (commercially available from E.I. du Pont de Nemours and Company, Wilmington, Del.) was treated with 15 grams of an ethoxylated alkyl $C_{13}$ to $C_{15}$ amine (Atmer-163, available commercially from Ciba Specialty Chemicals). The sample was heat cured for 1 hour at 100° C. to remove residual solvents. The treated pigment was dispersed into polyethylene at 70 wt. percent using a Banbary Farrel mixer.

This material, known as a masterbatch, was then let down to 3 wt. percent titanium dioxide in a cast film die to produce a 2 mil (50 micron) film. The measured surface resistivity was greater than 1 $E^{14}$ ohms.

Example 1

A 1000 gm sample of pigmentary silanized titanium dioxide (commercially available from E.I. du Pont de Nemours and Company, Wilmington, Del.) was treated with 15 grams of an ethoxylated $C_{13}$ to $C_{15}$ alkyl amine (Atmer-163 commercially available from Ciba Specialty Chemicals) Tarrytown, N.Y. and 15 grams of poly(oxy-1,2-ethanediyl), α-[3-[1,3,3,3-tetramethyl-1(trimethylsilyl)oxy]disiloxanyl] propyl]-ω-hydroxy (Q2-5211, available commercially from Dow Corning) in a V-cone blender. The sample was heat cured for 1 hour at 100° C. to remove residual solvents. The treated pigment was dispersed into polyethylene at 70 wt. percent using a Banbary Farrel mixer. This material, known as a masterbatch, was then let down to 3 wt. percent titanium dioxide in a cast film die to produce a 2 mil (50 micron) film. The measured surface resistivity was 2 $E^{10}$ ohms.

Example 2

A 1000 gm sample of pigmentary titanium dioxide (commercially available from E.I. du Pont de Nemours and Company, Wilmington, Del.) was treated with 10 grams of an ethoxylated $C_{13}$ to $C_{15}$ alkylamine (ATMER 163, available commercially from Ciba Specialty Chemicals) in a V-cone blender. To this pigment was further added 10 grams of a mixed polyethoxylated, polypropoxylated polysiloxane (Tegopren 5840 available commercially from Degussa Goldschmidt). The sample was heat cured for 1 hour at 100° C. to remove residual solvents. The treated pigment was dispersed into polyethylene at 70 wt. percent using a Banbary Farrel mixer, manufactured by Farrel Corp, Ansonia, Conn. This material, known as a masterbatch, was then let down to 3 wt. percent titanium dioxide in a cast film die to produce a 4 mil (101.6 micron) film. The measured surface resistivity of the film was 2.2 $E^{12}$ ohms.

TABLE 1

| Example No. | Grams Siloxane | ethoxylated alkylamine | Surface resistance, Ohms |
| --- | --- | --- | --- |
| C1 | none | none | $3.9E^{16}$ |
| C2 | Q2-5211, 10 g | none | $1.0E^{14}$ |
| C3 | none | ATMER 163, 15 g | $1E^{14}$ |
| 1 | Q2-5211, 15 g | ATMER 163, 15 g | $2E^{10}$ |
| 2 | Tegopren 5840, 10 g | ATMER 163, 10 g | $2.2E^{12}$ |

The resistivity measurements reported in the Examples above show a synergistic effect demonstrated by the lower surface resistivity measurement when the polymer film contains a titanium dioxide pigment treated with the polyethoxylated alkylamine and the siloxane as compared to a polymer film containing either the polyethoxylated alkylamine or the siloxane. Thickness of films varied but film thickness was not considered to matter as much as treatment loading.

Example 3

The following Table 2 provides the surface resistivity measurement of various films made in a manner similar to the above Examples. In particular titanium dioxide was treated with the weight percent amount of the siloxane, Q25211, and the ethoxylated amine, Atmer-163, noted in Table 2, based on the entire weight of the treated pigment using a V-Cone blender, as described in Example 1. The treating agents were added together or sequentially, as noted in Table 2. The treated pigments were then compounded into low density polyethylene (commercially available, 13.5 melt index (MI) Equistar NA206, Houston, Tex.) using a Banbary Farrel mixer at 60 wt. % titanium dioxide pigment to form a masterbatch. The resultant masterbatch was let down to 3 wt. % in a 2 melt index (MI) low density polyethylene (DuPont 20, commercially available from E.I. du Pont de Nemours and Company, Wilmington, Del.) and extruded through a cast die at 200° C. to produce a 2 mil (50.8 micron) film. The surface of the film was measured the next day, as previously described. The results are reported in Table 2.

TABLE 2

| Run | Siloxane Q2 5211, wt. % | Alkylamine Atmer-163, wt. % | Resistivity | Addition |
| --- | --- | --- | --- | --- |
| 1 | 0 | 0 | $>1E^{14}$ | |
| 2 | 1 | 2 | $2E^{12}$ | together |
| 3 | 0 | 1 | $1E^{14}$ | |
| 4 | 2 | 1 | $6.7E^{11}$ | together |
| 5 | 1 | 0 | $>1E^{14}$ | |
| 6 | 0 | 2 | $2.3E^{13}$ | |
| 7 | 1 | 1 | $1E^{12}$ | |
| 8 | 1 | 2 | $4.2E^{11}$ | together |
| 9 | 1.5 | 1.5 | $6.5E^{11}$ | together |
| 10 | 2 | 1 | $1E^{12}$ | together |
| 11 | 1 | 2 | $1.4E^{12}$ | sequentially |
| 12 | 1.5 | 1.5 | $1.5E^{12}$ | sequentially |
| 13 | 2 | 1 | $2.3E^{13}$ | sequentially |

Example 4

In the following Table 3 films were made in a manner similar to the films of Example 3, except that in one sample the siloxane treating agent was a mixed polyethoxylated, polypropoxylated polysiloxane (Tegopren 5840 available commercially from Degussa Goldschmidt). Films made in accordance with this Example 4 were tested for resistivity and the results reported in Table 3.

TABLE 3

| Run | Siloxane Q2 5211, wt. % | Siloxane, Tegopren 5840, wt. % | Alkylamine, Atmer-163, wt. % | Resistivity |
| --- | --- | --- | --- | --- |
| 14 | 2 | 0 | 2 | $3.7E^{11}$ |
| 15 | 0 | 2 | 2 | $4.8E^{12}$ |
| 16 | 0 | 0 | 2 | $4.2E^{13}$ |

The resistivity measurements reported in Tables 2 and 3 above show a synergistic effect demonstrated by the lower surface resistivity measurement when the polymer film contains a titanium dioxide pigment treated with the polyethoxylated alkylamine and the siloxane as compared to a polymer film containing either the polyethoxylated alkylamine or the siloxane but not both. Comparing Runs 6 and 13 of Table 2, it can be seen that twice as much alkylamine was required to achieve the same surface resistivity of $2.3E^{13}$ in Run 6 as in Run 13 which additionally contained the siloxane.

The description of illustrative and preferred embodiments of the present disclosure is not intended to limit the scope of the disclosure. Various modifications, alternative constructions and equivalents may be employed without departing from the true spirit and scope of the appended claims.

What is claimed is:

1. A shaped polymer article having improved surface resistivity comprising a major proportion of a thermoplastic polymer and a minor proportion of an antistatic system, wherein the antistatic system comprises an inorganic oxide having a surface treatment comprising (a) an ethoxylated alkylamine defined by the formula:

$$R^1N\text{—}(CH_2CH_2OH)_2$$

wherein $R^1$ is a $C_8$ to $C_{30}$ alkyl radical and
(b) a polyoxyalkylene siloxane defined by the formula:

$$(R^2)_3SiOSi(R^2)(R^3)OSi(R^2)_3$$

wherein
each $R^2$ is independently H, $CH_3$ or $C_2H_5$;
$R^3$ is a polyoxyalkylene group having the following formula:

$$\text{—}C_nH_{2n}OZR^4$$

wherein
Z is [ethylene oxide]$_a$ [propylene oxide]$_b$ in block or random order;
n is independently an integer of 2 to 8;
a is an integer of 0 to about 20; b is an integer of 0 to about 30; provided that a+b is from 1 to about 50;
$R^4$ is independently H, OH, $OCH_3$, acetyl, or a linear or branched alkyl or aryl group having 1 to about 20 carbon atoms.

2. The shaped polymer article of claim 1 wherein $R^1$ contains 13 to 15 carbon atoms.

3. The shaped polymer article of claim 1 wherein $R^2$ is H or $CH_3$ and $R^4$ is hydrogen or $CH_3$.

4. The shaped polymer article of claim 1 wherein $R^2$ is $CH_3$ and $R^4$ is hydrogen.

5. The shaped polymer article of claim 1 wherein the inorganic oxide is titanium dioxide.

6. The shaped polymer article of claim 1 in which the polyoxyalkylene siloxane is a polyoxyethylene trisiloxane.

7. The shaped polymer article of claim 1 wherein the thermoplastic polymer is selected from the group consisting of a polymer of an ethylenically unsaturated monomer; polyvinyl; polyvinyl ester; polystyrene; acrylic homopolymer and copolymer; phenolic; alkyd; amino resin; epoxy resin; amide; urethane; phenoxy resin; sulfone; carbonate; ester and chlorinated ester; ether; acetal resin; imide; and oxyethylene.

8. The shaped polymer article of claim 7 wherein the polymer of an ethylenically unsaturated monomer is a polyolefin.

9. The shaped polymer article of claim 7 wherein the polyolefin is selected from the group consisting of polyethylene, polypropylene, polybutylene, and copolymer of ethylene with a higher olefin or polyvinyl acetate.

10. The shaped polymer article of claim 1 wherein the polymer article is a film.

11. The shaped polymer article of claim 10 wherein the film has a surface resistivity of about $10E^{10}$ to about $10E^{13}$ ohms.

12. The shaped polymer article of claim 1 wherein the proportion of the thermoplastic polymer ranges from 80 wt. % to about 99.99 wt. % and the proportion of the treated pigment ranges from about 0.01 wt. % to about 20 wt. % based on the entire weight of the shaped polymer article.

13. The shaped polymer article of claim 1 wherein the antistatic system is made by a process comprising:
(i) metering the siloxane, the polyethoxylated alkylamine or a mixture thereof into a flow restrictor, having an inlet and an outlet, a motive gas, to create a zone of turbulence at the outlet of the flow restrictor thereby atomizing the siloxane, the polyethoxylated alkylamine or a mixture thereof to form an atomized liquid; and
(ii) contacting an inorganic pigment with the atomized liquid to form an antistatic agent with the atomized liquid.

14. A shaped polymer article having a low surface resistivity comprising a major proportion of a thermoplastic polymer and a minor proportion of an antistatic system, wherein the antistatic system comprises an inorganic oxide having a surface treatment comprising (a) an ethoxylated alkylamine defined by the formula:

$$R^1N\text{—}(CH_2CH_2OH)_2$$

wherein $R^1$ is a $C_8$ to $C_{30}$ alkyl radical and
(b) a reaction product of a siloxane having the structure:

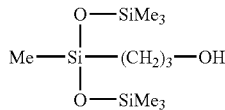

and the oxirane monomers:

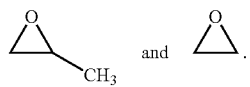

15. The shaped polymer article of claim 14 wherein the thermoplastic polymer is selected from the group consisting of a polymer of an ethylenically unsaturated monomer; polyvinyl; polyvinyl ester; polystyrene; acrylic homopolymer and copolymer; phenolic; alkyd; amino resin; epoxy resin; amide; urethane; phenoxy resin; sulfone; carbonate; ester and chlorinated ester; ether; acetal resin; imide; and oxyethylene.

16. The shaped polymer article of claim 14 wherein the polymer of an ethylenically unsaturated monomer is a polyolefin.

17. The shaped polymer article of claim 16 wherein the polyolefin is selected from the group consisting of polyethylene, polypropylene, polybutylene, and copolymer of ethylene with a higher olefin or polyvinyl acetate.

18. The shaped polymer article of claim 14 wherein the polymer article is a film.

19. The shaped polymer article of claim 18 wherein the film has a surface resistivity of about $10E^{10}$ to about $10E^{13}$ ohms.

20. The shaped polymer article of claim 14 wherein the proportion of the thermoplastic polymer ranges from 80 wt. % to about 99.99 wt. % and the proportion of the surface treated inorganic oxide ranges from about 0.01 wt. % to about 20 wt. % based on the entire weight of the shaped polymer article.

* * * * *